(12) United States Patent
Constantine et al.

(10) Patent No.: US 9,801,365 B2
(45) Date of Patent: Oct. 31, 2017

(54) JAW SPREADER FOR REMOVING FISHING TACKLE

(71) Applicant: Acme United Corporation, Fairfield, CT (US)

(72) Inventors: Richard S. Constantine, Monroe, CT (US); John C. Ward, Erin (CA)

(73) Assignee: Acme United Corporation, Fairfield, CT (US)

( * ) Notice: Subject to any disclaimer, the term of this patent is extended or adjusted under 35 U.S.C. 154(b) by 38 days.

(21) Appl. No.: 14/748,622

(22) Filed: Jun. 24, 2015

(65) Prior Publication Data
US 2016/0374324 A1 Dec. 29, 2016

(51) Int. Cl.
*A01K 97/18* (2006.01)
*B25B 9/02* (2006.01)

(52) U.S. Cl.
CPC ............... *A01K 97/18* (2013.01); *B25B 9/02* (2013.01)

(58) Field of Classification Search
CPC ..................................................... A01K 97/18
USPC ............. 43/53.5; 294/93; 600/235, 237–239, 600/243, 244; 29/222, 223; 81/302
See application file for complete search history.

(56) References Cited

U.S. PATENT DOCUMENTS

| 51,220 A | * | 11/1865 | Reynolds | ................. | B65B 67/12 294/93 |
| 116,226 A | * | 6/1871 | Seipt | ........................ | A47J 45/10 294/93 |
| 134,756 A | * | 1/1873 | Marston | ..................... | G09F 3/14 294/100 |
| 209,989 A | * | 11/1878 | Shinn | ....................... | F41A 15/22 294/93 |
| 210,163 A | * | 11/1878 | Steinmetz | ............... | A01M 3/00 43/134 |
| 276,064 A | * | 4/1883 | Morse | ....................... | B67B 7/18 29/222 |
| 348,717 A | * | 9/1886 | Bradbury | ................. | A47J 45/10 43/53.5 |
| 400,112 A | * | 3/1889 | Post | ....................... | A01K 97/18 43/53.5 |
| 426,981 A | * | 4/1890 | Asselin | .................... | B65B 67/12 294/93 |
| 456,776 A | * | 7/1891 | Prior | ...................... | A01K 83/02 43/36 |

(Continued)

FOREIGN PATENT DOCUMENTS

JP 2001061392 A * 3/2001
JP 4276495 B2 * 6/2009

*Primary Examiner* — Darren W Ark
(74) *Attorney, Agent, or Firm* — Alix, Yale & Ristas, LLP

(57) ABSTRACT

A jaw spreader device is adapted to spread apart the jaws of a fish to facilitate removal of a hook or lure from the fish. The device has a spring biased tong-like configuration wherein in the normal configuration; the distal ends are spread apart. A lock mechanism locks the device in a compact locked position to facilitate insertion between the fish jaws into the mouth of the fish. The working ends of the each tong includes a flattened blade, an arcuate bend and a transverse spreader bar. Upon insertion of the device into the jaws/mouth of the fish release of the lock mechanism, the jaws are forced apart and biased to provide a stable enlarged opening. The spreading device may then be manually compressed to facilitate withdrawal from the fish.

8 Claims, 10 Drawing Sheets

(56) References Cited

U.S. PATENT DOCUMENTS

| | | | | |
|---|---|---|---|---|
| 579,625 A * | 3/1897 | Willbrandt | A61B 1/32 | 43/53.5 |
| 643,266 A * | 2/1900 | Griggs | A47F 7/06 | 206/9 |
| 815,907 A * | 3/1906 | Davis | A61B 1/32 | 600/237 |
| 829,304 A * | 8/1906 | Tilton | B65G 7/12 | 294/93 |
| 835,968 A * | 11/1906 | Mennes | A61H 1/0288 | 43/53.5 |
| 888,484 A * | 5/1908 | Gehorsam | A61B 17/0206 | 43/53.5 |
| 1,025,362 A * | 5/1912 | Beuoy | A61B 17/30 | 43/53.5 |
| 1,076,830 A * | 10/1913 | Jasper | A62C 4/00 | 294/93 |
| 1,100,486 A * | 6/1914 | Merliss | B25B 27/12 | 43/53.5 |
| 1,208,671 A * | 12/1916 | Severtsen | A01K 97/18 | 43/53.5 |
| 1,226,367 A * | 5/1917 | Potenza | F24B 15/00 | 294/93 |
| 1,250,500 A * | 12/1917 | Pipp | B05C 13/00 | 294/93 |
| 1,267,336 A * | 5/1918 | Bubb | B25B 9/02 | 294/99.2 |
| 1,377,730 A * | 5/1921 | Rogers | B25B 27/12 | 29/222 |
| 1,389,436 A * | 8/1921 | Cameron | A61B 1/24 | 600/237 |
| 1,433,041 A * | 10/1922 | Schwartz | A01K 97/18 | 43/53.5 |
| 1,450,419 A * | 4/1923 | Heidbrink | A61C 3/10 | 600/237 |
| 1,477,786 A * | 12/1923 | Tillier | B25B 27/12 | 29/223 |
| 1,755,294 A * | 4/1930 | Grover | B25B 27/12 | 29/222 |
| 1,879,161 A * | 9/1932 | Frambach | A01K 97/18 | 43/53.5 |
| 1,952,990 A * | 3/1934 | Kirsch | A01K 97/18 | 43/53.5 |
| 1,995,165 A * | 3/1935 | Anderson | B25B 27/12 | 29/223 |
| 2,023,521 A * | 12/1935 | Furnas | A47J 45/10 | 294/28 |
| 2,058,128 A * | 10/1936 | Brubach | G01N 1/312 | 294/93 |
| 2,164,907 A * | 7/1939 | Falkner | A01K 97/18 | 43/53.5 |
| 2,234,715 A * | 3/1941 | Whitney | A01N 1/00 | 294/93 |
| 2,238,563 A * | 4/1941 | Jacques | A61B 17/02 | 600/217 |
| 2,319,112 A * | 5/1943 | Christoph | A01K 97/18 | 43/53.5 |
| D152,478 S * | 1/1949 | Hutchinson et al. | | 43/53.5 |
| 2,481,007 A * | 9/1949 | Dugdale | A01K 97/18 | 43/53.5 |
| 2,504,227 A * | 4/1950 | Rubba | A61C 3/14 | 43/53.5 |
| 2,505,289 A * | 4/1950 | Haslett | B65B 67/1205 | 294/93 |
| 2,531,522 A * | 11/1950 | Malouf | A01K 97/00 | 43/53.5 |
| 2,561,283 A * | 7/1951 | Leslie | A22C 25/06 | 43/53.5 |
| 2,581,679 A * | 1/1952 | Marshall | A61D 15/00 | 600/243 |
| 2,595,989 A * | 5/1952 | Smeltz | A01K 97/18 | 43/53.5 |
| 2,629,962 A * | 2/1953 | Lambert | A01K 97/18 | 43/53.5 |
| 2,643,151 A * | 6/1953 | Zupancic | A01K 97/00 | 43/53.5 |
| 2,651,300 A * | 9/1953 | Fehrman | A61D 15/00 | 600/244 |
| 2,676,505 A * | 4/1954 | Goodnight | B25B 27/0042 | 81/302 |
| 2,747,321 A * | 5/1956 | Thompson | A01K 97/18 | 43/53.5 |
| 2,750,705 A * | 6/1956 | Keveney | A01K 97/18 | 43/53.5 |
| 2,781,807 A * | 2/1957 | Labbee | B25B 23/105 | 81/444 |
| 2,785,501 A * | 3/1957 | Nicholson | A01K 97/18 | 43/53.5 |
| 2,867,937 A * | 1/1959 | Little | A01K 97/18 | 43/53.5 |
| 2,932,117 A * | 4/1960 | Wear | A01K 97/18 | 43/53.5 |
| 3,012,360 A * | 12/1961 | Creel | A01K 97/18 | 43/53.5 |
| 3,019,521 A * | 2/1962 | Clark | B23Q 3/18 | 294/93 |
| 3,106,035 A * | 10/1963 | Tennyson | A01K 97/18 | 43/53.5 |
| 3,106,332 A * | 10/1963 | Dieguez | B65D 5/004 | 206/510 |
| 3,201,815 A * | 8/1965 | Selby | A47L 25/005 | 294/93 |
| 3,367,703 A * | 2/1968 | Pittis | A01K 97/00 | 294/16 |
| 3,405,963 A * | 10/1968 | Neely | A22C 25/025 | 43/53.5 |
| 3,514,892 A * | 6/1970 | Wormsbecker | A01K 97/18 | 43/53.5 |
| 3,521,396 A * | 7/1970 | Allen | A01K 97/18 | 43/53.5 |
| 3,555,718 A * | 1/1971 | Montgomery | A01K 97/18 | 43/53.5 |
| 3,675,359 A * | 7/1972 | Ohno | A01K 97/18 | 30/271 |
| 3,707,800 A * | 1/1973 | Wolfe | A01K 97/18 | 43/53.5 |
| 3,750,936 A * | 8/1973 | Crane | B65D 5/46048 | 206/510 |
| 3,981,471 A * | 9/1976 | Currier | B65G 17/323 | 294/93 |
| 4,019,255 A * | 4/1977 | Cohen | A61B 1/24 | 600/242 |
| 4,023,303 A * | 5/1977 | Maunu | A01K 97/18 | 43/53.5 |
| 4,039,121 A * | 8/1977 | Crane | B65D 5/004 | 294/93 |
| 4,138,939 A * | 2/1979 | Feld | A47J 43/24 | 99/418 |
| 4,165,746 A * | 8/1979 | Burgin | A61B 17/0206 | 81/302 |
| 4,213,460 A * | 7/1980 | Weiner | A61B 17/2812 | 43/134 |
| 4,282,625 A * | 8/1981 | Hulett | A47J 37/0786 | 15/104.04 |
| 4,323,272 A * | 4/1982 | Fortier | E01H 1/1206 | 294/1.4 |
| 4,409,184 A * | 10/1983 | Giroir | G01N 1/28 | 294/99.2 |
| 4,442,837 A * | 4/1984 | Keatley | A01M 3/00 | 43/134 |
| 4,563,833 A * | 1/1986 | Aucoin | A01K 97/00 | 43/53.5 |
| 4,877,280 A * | 10/1989 | Milano | A47J 31/08 | 294/99.2 |
| 5,002,323 A * | 3/1991 | Idsund | A61B 17/30 | 294/100 |
| 5,030,224 A * | 7/1991 | Wright | A61B 17/083 | 600/209 |

(56) References Cited

U.S. PATENT DOCUMENTS

| | | | | |
|---|---|---|---|---|
| 5,048,882 A * | 9/1991 | Fielding | A47J 37/0694 | 294/33 |
| 5,081,789 A * | 1/1992 | Rhee | A01M 3/00 | 43/134 |
| 5,092,074 A * | 3/1992 | Zincke | A01K 97/00 | 43/53.5 |
| 5,147,369 A * | 9/1992 | Wagner | A61B 17/30 | 294/99.2 |
| 5,192,106 A * | 3/1993 | Kaufman | G11B 23/00 | 294/93 |
| D354,095 S * | 1/1995 | Aspinwall | D22/149 | |
| 5,421,630 A * | 6/1995 | Sergi | G11B 23/00 | 294/93 |
| 5,433,190 A * | 7/1995 | Sunalp | A61B 17/0231 | 600/236 |
| 5,441,040 A * | 8/1995 | Williams, Jr. | A61B 17/0231 | 600/236 |
| 5,636,468 A * | 6/1997 | Valpredo | A01K 97/14 | 43/53.5 |
| 5,822,915 A * | 10/1998 | Walker | A01K 97/00 | 43/53.5 |
| 6,205,699 B1 * | 3/2001 | Bogni | A01K 97/18 | 43/53.5 |
| 6,397,512 B1 * | 6/2002 | Chang | A01K 97/18 | 43/53.5 |
| 6,544,169 B2 * | 4/2003 | Putrino | A61B 17/0231 | 600/236 |
| 6,702,739 B2 * | 3/2004 | Levisman | A61B 1/24 | 600/237 |
| 7,114,279 B2 * | 10/2006 | Brauner | A01K 83/00 | 43/53.5 |
| 7,985,180 B2 * | 7/2011 | Brown | A61B 1/32 | 600/235 |
| 8,287,565 B2 * | 10/2012 | Risto | A61B 17/02 | 606/206 |
| 8,806,800 B2 * | 8/2014 | Hupp | A01K 97/00 | 43/4 |
| 9,016,738 B2 * | 4/2015 | Smith | E04H 4/16 | 294/99.2 |
| 9,456,596 B2 * | 10/2016 | Lawrence | A01K 97/18 | |
| 9,485,996 B2 * | 11/2016 | Ellis | A22B 5/0005 | |
| 2003/0088158 A1 * | 5/2003 | Chien | A63B 23/032 | 600/237 |
| 2007/0256349 A1 * | 11/2007 | Fyvolent | A01K 91/04 | 43/53.5 |
| 2008/0271360 A1 * | 11/2008 | Barfield | A01K 97/18 | 43/53.5 |
| 2009/0025273 A1 * | 1/2009 | Gauger | A01K 97/18 | 43/53.5 |
| 2010/0281758 A1 * | 11/2010 | McFann | A01K 97/18 | 43/53.5 |
| 2014/0202063 A1 * | 7/2014 | Webster | A01K 97/18 | 43/53.5 |
| 2014/0202064 A1 * | 7/2014 | Lawrence | A01K 97/18 | 43/53.5 |

* cited by examiner

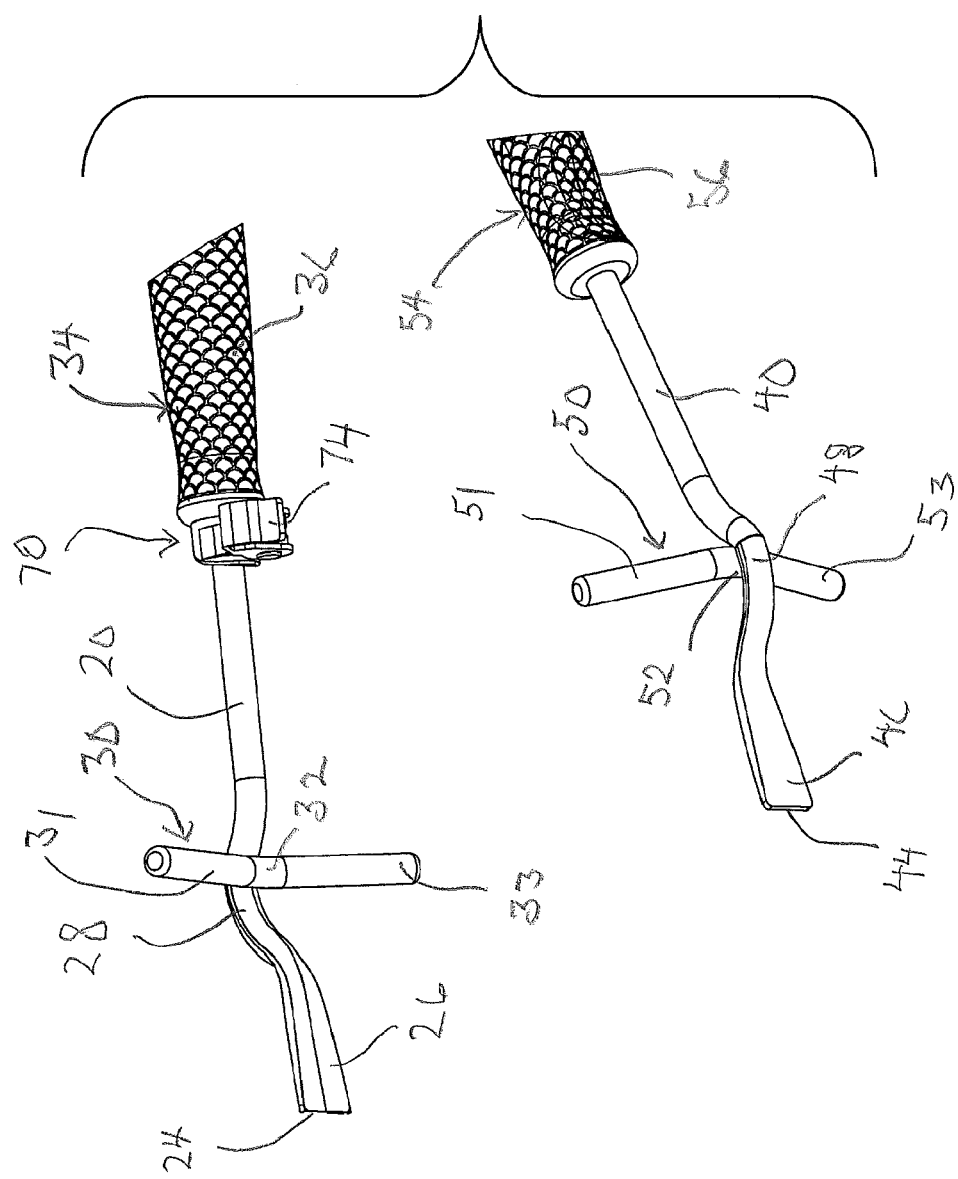

JAW SPREADER FOR REMOVING FISHING TACKLE

BACKGROUND

This disclosure relates generally to devices and methods for removing fishing tackle from fish. More particularly, this disclosure relates to methods and devices for spreading open the jaw of a fish.

An important activity in the sport of fishing is to remove fishing tackle from the fish after landing same. Numerous tools, devices and techniques have been advanced to facilitate the removal of the fishing tackle. For some fish which have relatively small and/or strong jaws, the removal can be quite problematic. If a landed fish is to be released, it is highly desirable to minimize damage to the mouth and jaw structure and other internal structures of the fish. For certain fish species with relatively small and strong mouth/jaw structures, it is highly desirable to force the jaws apart to provide a stable enlarged opening for the tackle removing process.

SUMMARY

Briefly stated, a jaw spreader in a preferred form is adapted for removing fishing tackle from a landed fish. A first elongated tong has a proximal end and a longitudinally spaced distal end. A second elongated tong has a proximal end and a longitudinally spaced distal end. A biasing structure connects the proximal ends so that the distal ends are biased apart. The first tong mounts a generally transverse spreader bar, a grip and a locking mechanism and has a generally quasi-flattened blade at the distal end. The second tong mounts a generally transverse spreader bar generally opposite the first tong bar and a grip generally opposite the first tong grip and has a generally quasi-flattened blade at the distal end. In a locked position, the lock mechanism engages the second tong such that the blades engage or converge towards each other. In a released position, the lock mechanism is disengaged from the second tong, and the blades and spreader bars are biased apart.

In one preferred embodiment, the biasing structure is a coil spring. The transfer spreader bars each further comprise a pair of angled bar portions extending from an intermediate apex. Each grip preferably comprises a sleeve. The sleeve is preferably formed from plastic or rubber material. Each said grip preferably has a segmented surface. The first and the second tong each have an arcuate bend which transitions to the blade. A lock mechanism is mounted to the first tong by a strap. The lock mechanism comprises a pivotal arcuate clasp which engages a rod-like portion of the second tong. The first and the second tongs are substantially identical, and the transverse spreader bars and grips are also preferably substantially identical.

A jaw spreader for removing tackle comprises a first elongated tong having a proximal end and a generally linear rod-like portion extending to an arcuate bend and having a longitudinally spaced blade at the distal end. A second elongated tong has a proximal end and a generally linear rod-like portion extending to an arcuate bend. The second tong has a longitudinally spaced blade at the distal end and is substantially identical to the first tong. A coil spring integrally interconnects the proximal ends so that the distal ends are biased apart. A generally transverse spreader bar and a grip are mounted to the first tong. A generally transverse spreader bar and a grip are also mounted to the second tong and are disposed in a generally opposing relationship to the spreader bar and the grip of the first tong.

A lock mechanism is mounted to the first tong and is engagable with a rod-like portion of the second tong. In a locked position, the lock mechanism engages the second tong so that the blades engage or converge toward each other. In a released position, the lock mechanism is disengaged from the second tong, and the blades and spreader bars are biased apart. The spreader bars are each substantially identical and have bar portions slightly angled to each other at a medial vertex. The grips are preferably sleeve-like members which are formed from rubber or plastic and have a segmented surface. In a release position, the blades engage to form a substantially v-shaped section.

BRIEF DESCRIPTION OF THE DRAWINGS

FIG. 17 is an enlarged fragmentary view of the jaw spreader device in a fully released position.

DETAILED DESCRIPTION

Figure 1:
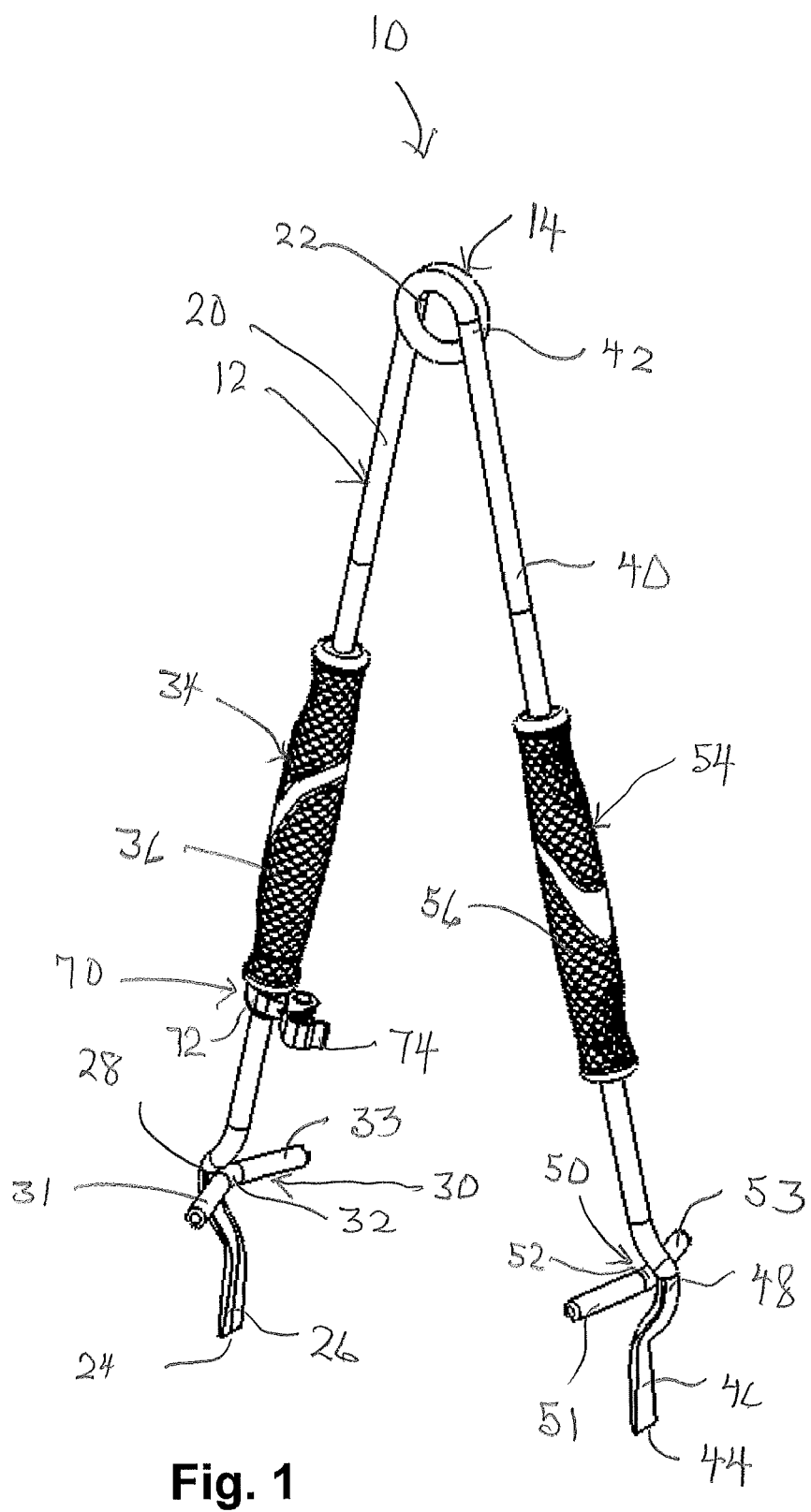
FIG. 1 is a perspective view of a jaw spreader device in an operative expanded mode.
Figures 2, 3:
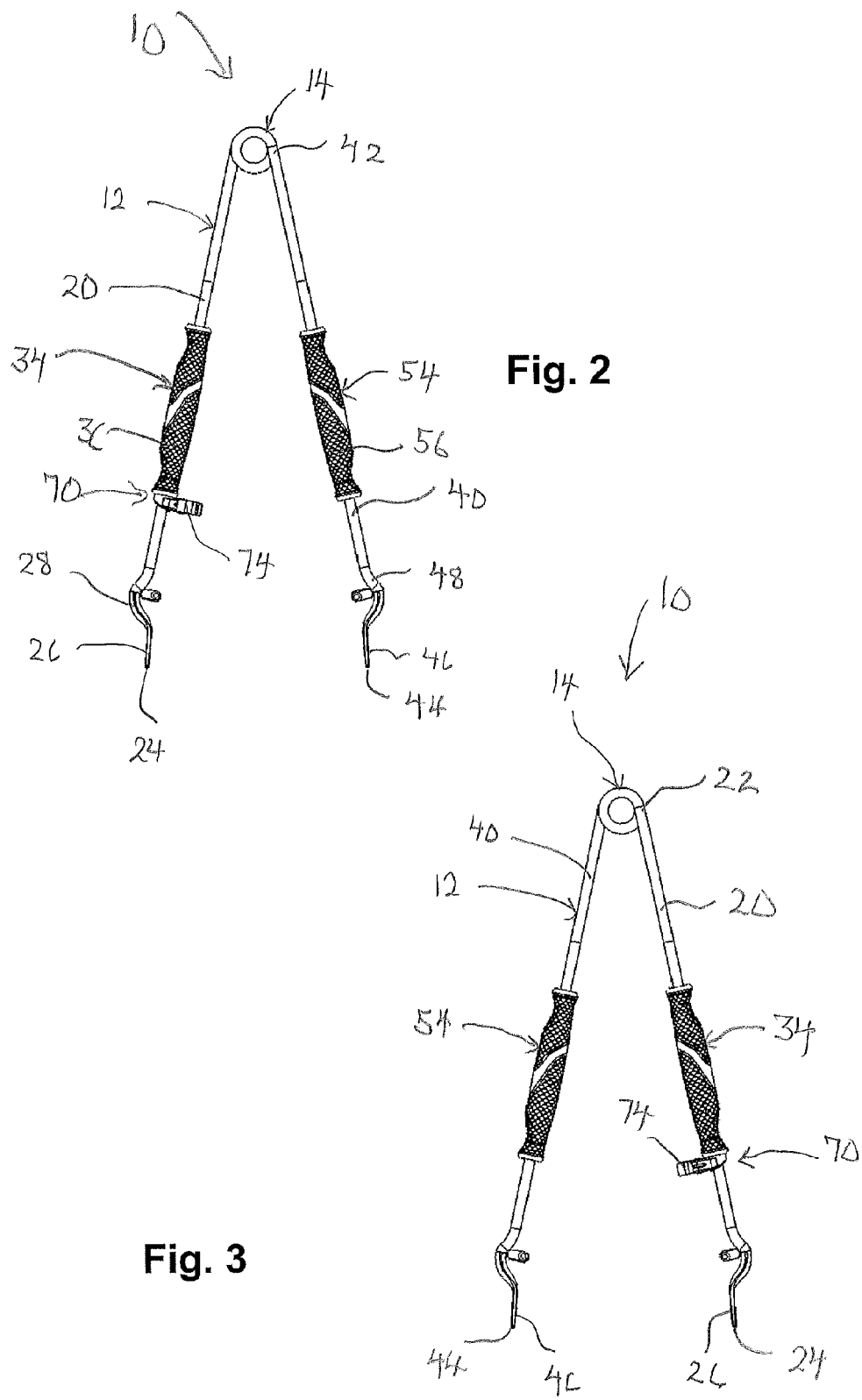
FIG. 2 is a front view thereof.
FIG. 3 is a rear view thereof.
Figure 4:
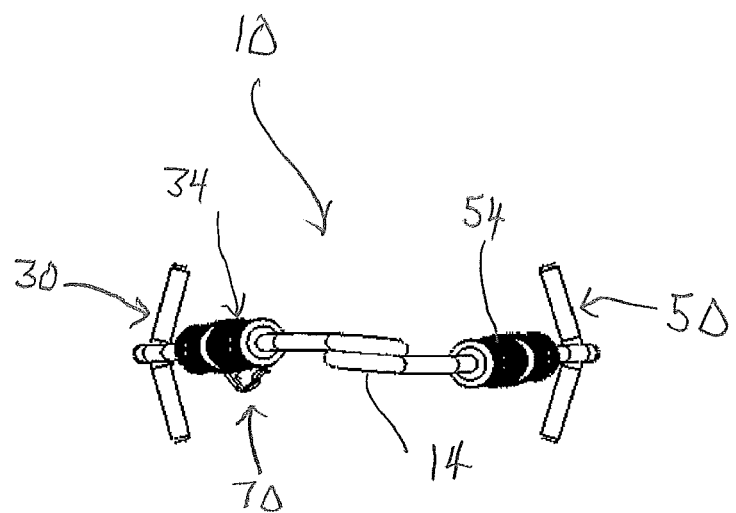
FIG. 4 is a top plan view thereof.
Figure 5:
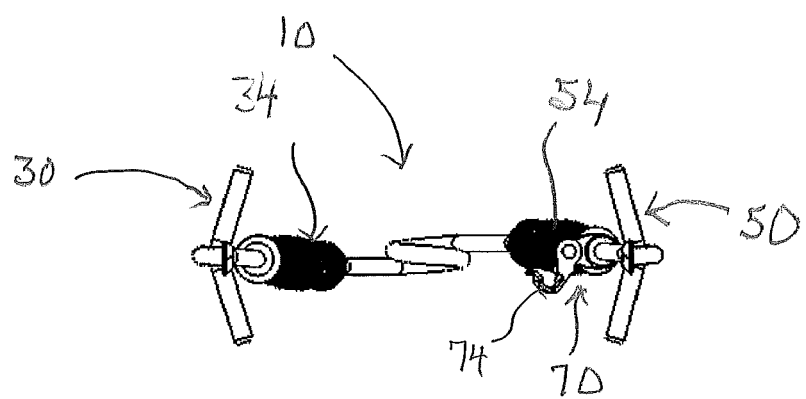
FIG. 5 is a bottom plan view thereof.
Figure 6:
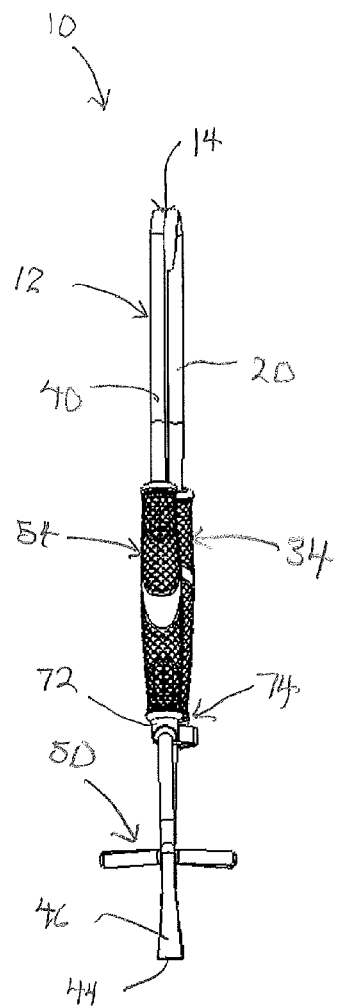
FIG. 6 is a right side view thereof.
Figure 7:
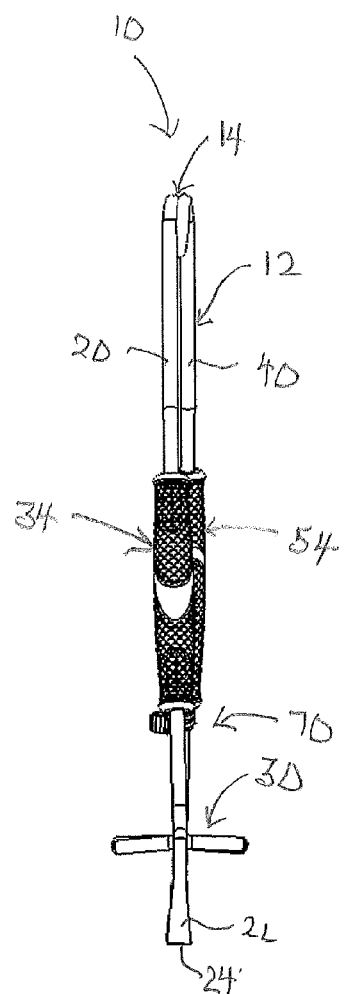
FIG. 7 is a left side view thereof.
Figure 8:
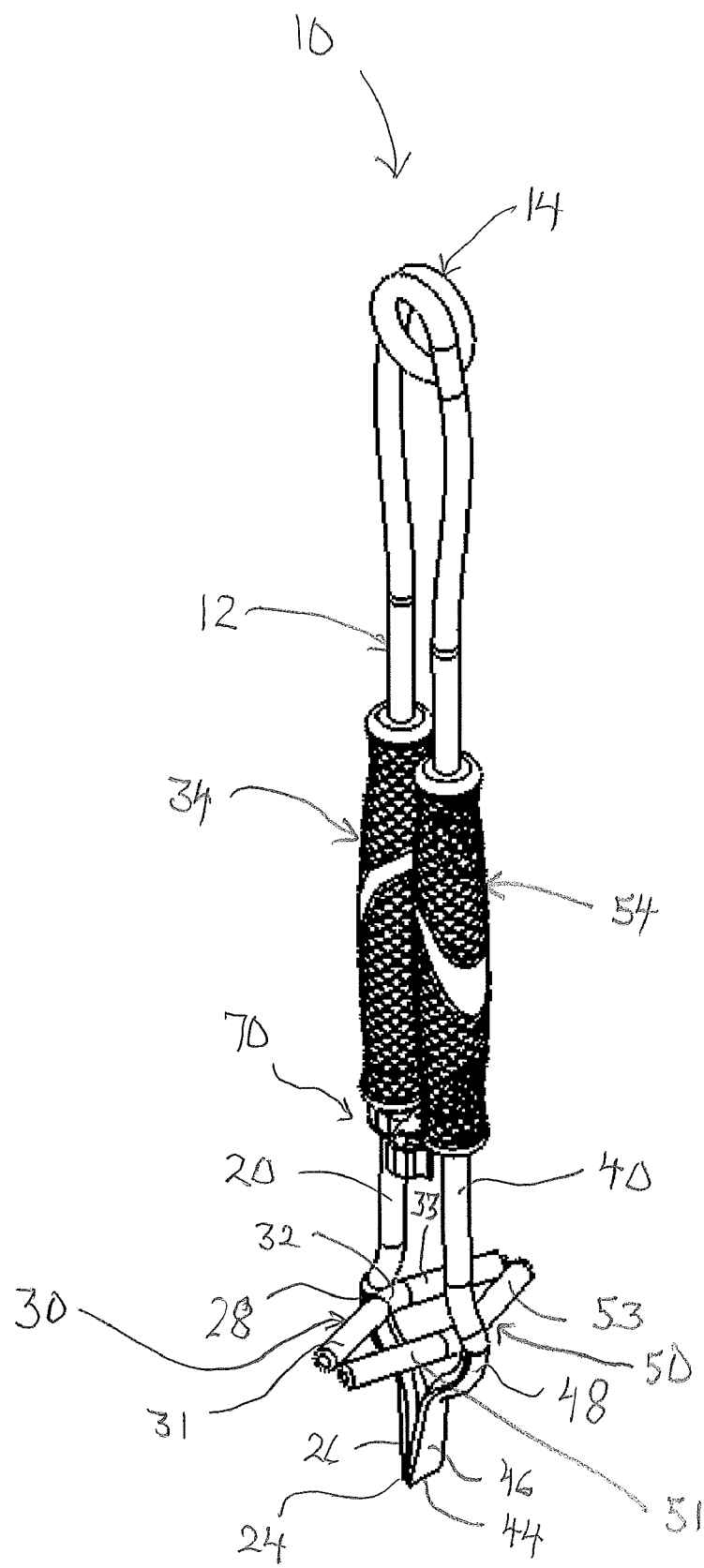
FIG. 8 is a perspective view of the jaw spreader device in a contracted locked position.
Figure 9:
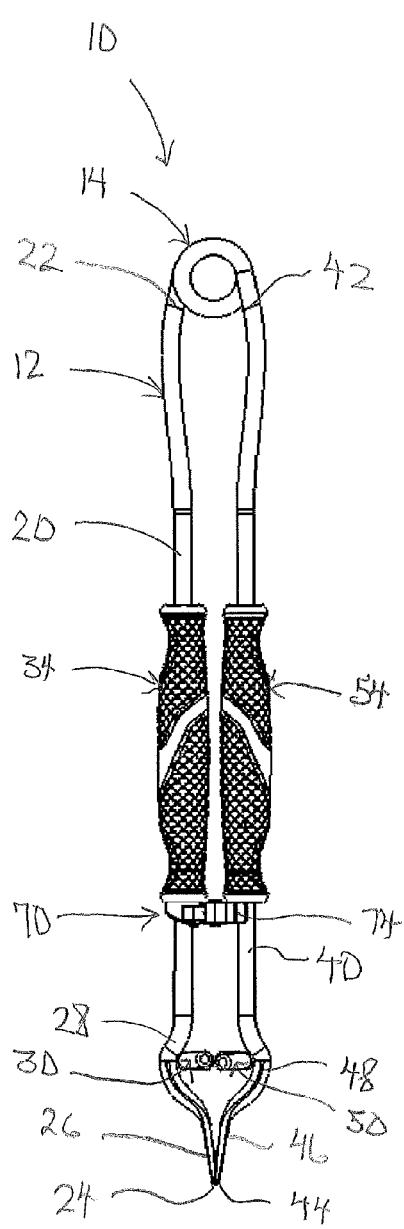
FIG. 9 is a front view thereof.
Figure 10:
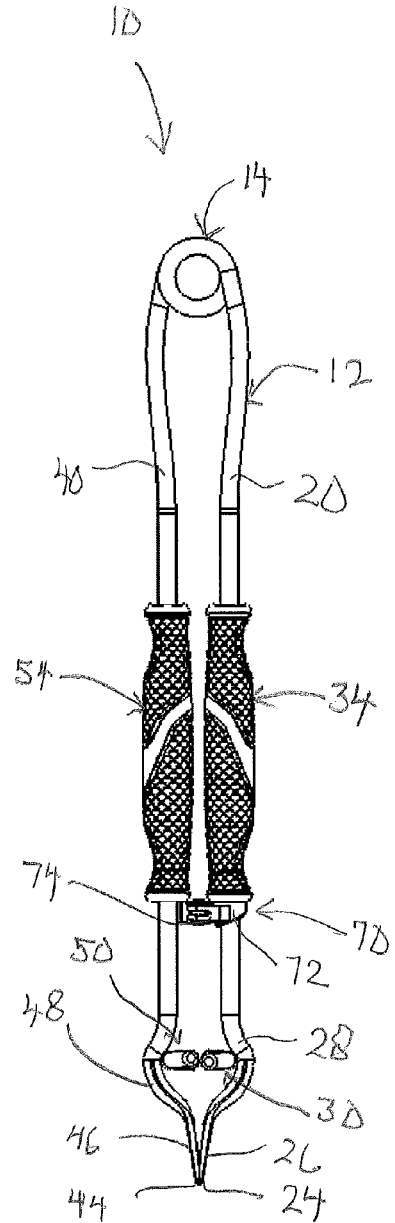
FIG. 10 is a rear view thereof.
Figure 11:
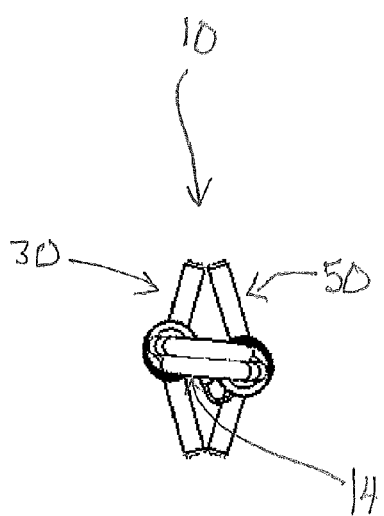
FIG. 11 is a top plan view thereof.
Figure 12:
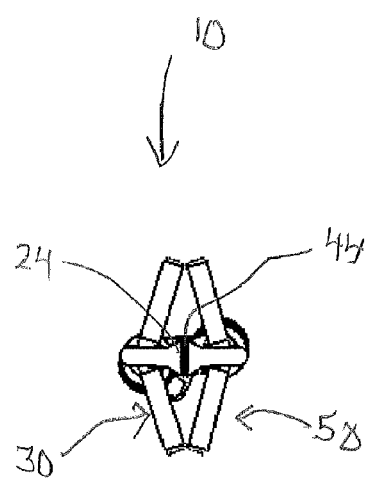
FIG. 12 is a bottom plan view thereof.
Figure 13:
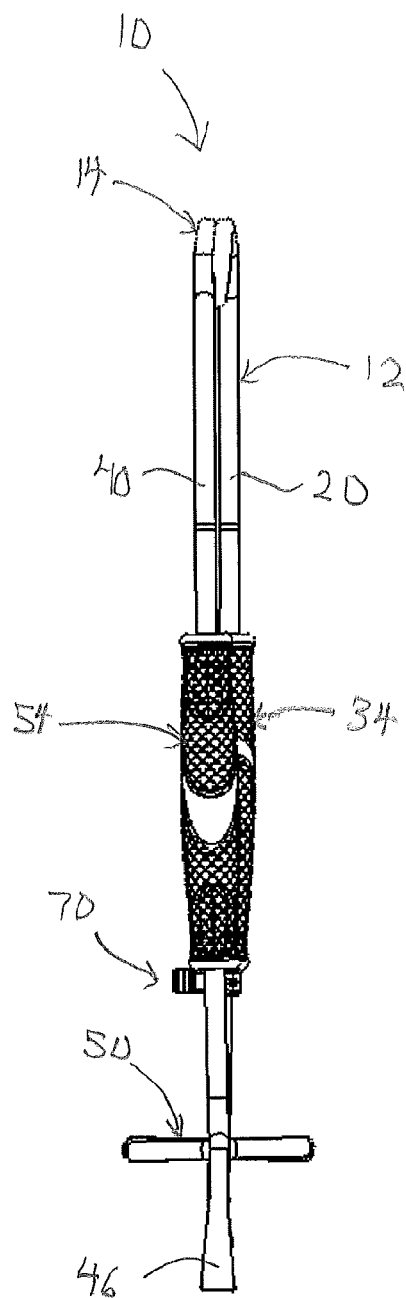
FIG. 13 is a right side view thereof.
Figure 14:
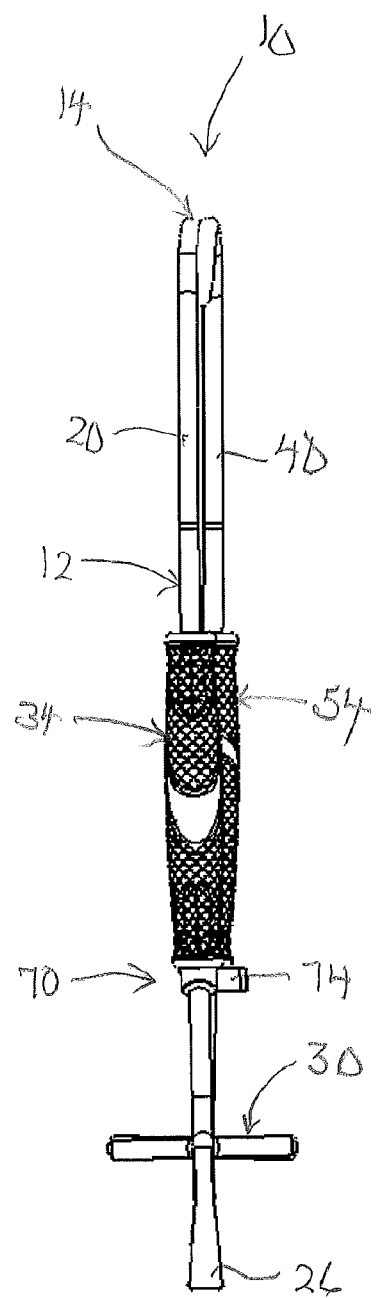
FIG. 14 is a left side view thereof.

With reference to the drawings wherein like drawings represent like parts throughout the several figures, a jaw spreader device is generally designated by the numeral 10. The jaw spreader device 10 is adapted for use by a fisherman in connection with spreading the jaws of a landed fish to remove fishing tackle. The jaw spreader device 10 is configured for a one-handed manipulation for bi-modal transformation between a contracted lock mode (FIG. 8) and an expanded release mode (FIG. 1). In the lock mode, the spreading device has a compact form adapted to facilitate insertion into the mouth of a fish (not illustrated), and in the release mode, the device 10 is adapted to spring apart to force the jaws of the fish apart and maintain same so that fishing tackle, such as, for example, a hook or a lure, can be more easily removed from the fish.

The spreader device 10 may be generally characterized as a cooperative tong-like tool with a locking mechanism. In one preferred embodiment, the principal structural component is a unitary tong-like member 12 formed from a spring steel rod or tube or similar material which is medially bent or coiled at a proximal apex 14 so that the working ends of the member are biased apart and require application of a compressive force to force the working end structures together.

The spreader device 10, although principally a unitary member, may be described in terms of a first tong 20 of generally elongated form and a second tong 40 of generally elongated form. The tongs 20 and 40 are both slightly bowed at an upper portion and have a generally linear intermediate portion. The respective tongs 20 and 40 each have a proximal end 22 and 42, respectively, which integrally connect to form the apex 14 which functions as a spring to bias the connected tongs apart. In a normal condition, the tongs are most dramatically biased apart at distal ends 24 and 44, respectively. The tongs 20 and 40 preferably have substantially the same dimensions and are disposed in cooperative facing relationship.

Tong 20 includes at the distal end 24 an integral tapered flattened blade 26 which transitions from an adjacent arcuate bend 28. A spreader bar 30 having an intermediate vertex 32 and a pair of slightly angled bar portions 31 and 33 is affixed by welding or other attachment means between the vertex 32 and an inner location of the bend 28. The spreader bar 30 is oriented substantially transverse or perpendicular to a longitudinal axis through the intermediate portion of the tong 20. The intermediate rod-like portion of the tong receives a sleeve-like grip 34. The grip 34 is formed of rubber or other plastic material. The grip 34 has a segmented surface 36 to facilitate the manual gripping of the tong.

Tong 40 includes at the distal end 44 an integral tapered flattened blade 46 which transitions from an adjacent arcuate bend 48. A spreader bar 50 having an intermediate vertex 52 and a pair of slightly angled bar portions 51 and 53 is affixed by welding or other attachment means between the vertex 52 and an inner location of the bend 48. The spreader bar 50 is oriented substantially transverse or perpendicular to a longitudinal axis through the upper portion of the tong 40. The intermediate rod-like portion of the tong receives a sleeve-like grip 54. The grip 54 is formed of rubber or other plastic material. The grip 54 has a segmented surface 56 to facilitate the manual gripping of the tong.

Figure 15:
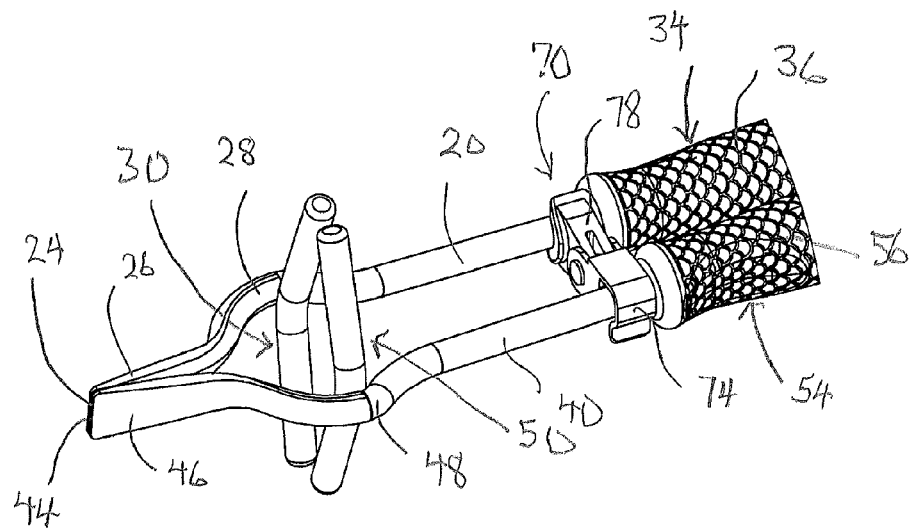
FIG. 15 is an enlarged fragmentary view of the jaw spreader device in the contracted locked position.
Figure 16:
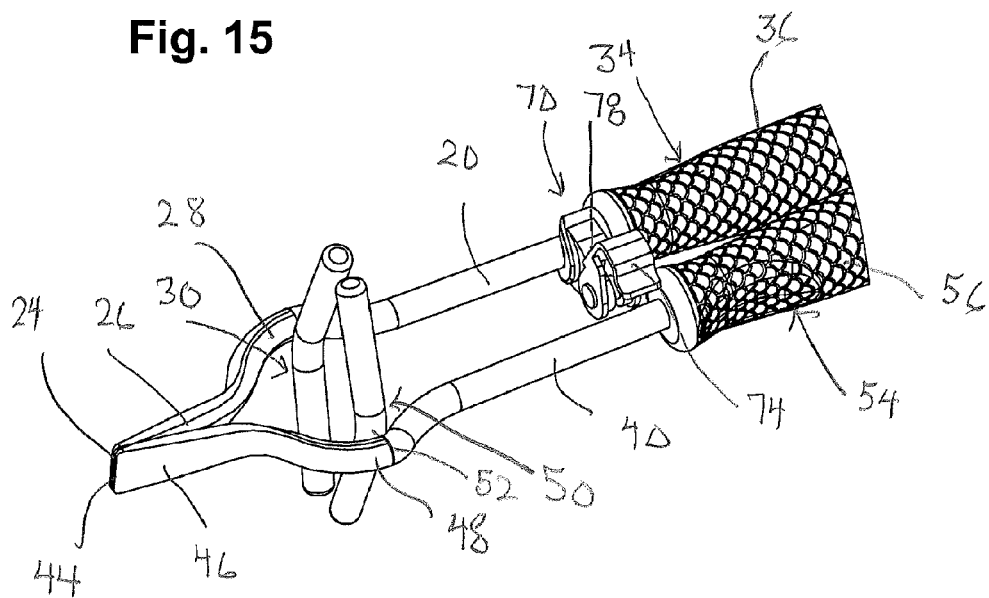
FIG. 16 is an enlarged fragmentary view of the jaw spreader device upon initial transforming to a released unlocked position.

Tong 20 mounts a lock mechanism 70 just below the grip 34 and above the spreader bar 30. Lock mechanism 70 is secured to a rod section by a band 72. The lock mechanism has a pivotal arcuate clasp 74 configured to selectively engage the second tong 40. The clasp 74 in the engaged mode is spring loaded by the spiral coil at apex 14. The locked positon may also be secured by a leaf 78 (FIG. 15), which engages against a shoulder of the clasp and is depressible to release the clasp 74 (FIG. 16). In the locked position illustrated in FIG. 15, the distal blades 24 and 44 of the spreader device engage to form a v-shaped section and a quasi-point-like engagement, and the spreader bars 30 and 50 are disposed in adjacent and opposed relationship. When the locking mechanism is released, such as illustrated in FIGS. 1, 16 and 17, for example, the ends 24 and 34 and the spreader bars 30 and 20 spring apart to an expanded mode.

The jaw spreading device 10 functions in a highly efficient manually operated manner. When it is desired to remove the tackle from the landed fish, the spreading device is locked in the locked mode. The convergent flattened blades 24 and 34 are inserted between the jaws and forced into the mouth of the fish. Upon insertion, the bends 28 and 48 gradually force the jaws open. After the spreader bars 30 and 50 pass into the mouth, the lock mechanism 70 is released by withdrawing or pivoting the clasps 74 from the tong 40. The jaws are spread open to provide an enlarged opening for accessing the tackle. The biased forcing of the jaws provides an enlarged stable opening to facilitate the removal of the hook and/or lure from the fish. The spreading device 10 may then be removed from the fish by compressively grasping the grips 34 and 54, thereby forcing the blades of the device together, and subsequently withdrawing the distal end portions of the device from the fish.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A jaw spreader for removing fishing tackle comprising:
   a first elongated tong having a proximal end and a generally linear rod-like portion extending to an arcuate bend and having a longitudinally spaced blade at a distal end;
   a second elongated tong having a proximal end and a generally linear rod-like portion extending to an arcuate bend and having a longitudinally spaced blade at a distal end and being substantially identical to said first tong;
   a coil spring interconnecting said proximal ends and so that said distal ends are biased apart;
   a first generally transverse spreader bar having a first medial portion and opposed free ends, said first medial portion mounted to said first tong and a grip mounted to said first tong;
   a second generally transverse spreader bar having a second medial portion and opposed free ends, said second medial portion mounted to said second tong and a grip mounted to said second tong and disposed in generally opposing relationship to said spreader bar and grip of said first tong;
   a lock mechanism mounted to said first tong and engageable with the rod-like portion of said second tong;
   wherein in a locked position, said lock mechanism engages said second tong so that said blades engage or converge toward each other, and in a released position, said lock mechanism is disengaged from said second tong and said blades and said spreader bars are biased apart.

2. The jaw spreader of claim 1 wherein each said spreader bar comprises a medial vertex at said medial portion and slightly angled bar portions extending from said medial vertex, said slightly angled bar portions defining said opposed free ends.

3. The spreader bar of claim 1 wherein each said grip has a sleeve-like configuration disposed between each said spreader bar and said coil spring.

4. The jaw spreader of claim 3 wherein each said grip is formed from rubber or plastic material and has a segmented surface.

5. The jaw spreader of claim 1 wherein said lock mechanism comprises a pivotal clasp and in said locked position, the coil spring biases between said first and second tongs to secure said locked position.

6. The jaw spreader of claim 1 wherein a band secures the lock mechanism to said first tong.

7. The jaw spreader of claim 1 wherein in said locked position, said blades engage to form a substantially v-shaped section.

8. The jaw spreader of claim 1 wherein said first and second tongs each has a bowed portion between said proximal ends and said generally linear rod-like portions.

* * * * *